July 17, 1962 G. E. DRAKEFORD ETAL 3,044,523

PNEUMATIC TIRES

Filed Sept. 1, 1959

Inventors
Francis Edmund Smith
George Edward Drakeford
by Benj. T. Rauber
his attorney 3,044,523
PNEUMATIC TIRES
George Edward Drakeford, Walmley, Sutton Coldfield, and Francis Edmund Smith, Sutton Coldfield, England, assignors to Dunlop Rubber Company Limited, London, England, a company of Great Britain
Filed Sept. 1, 1959, Ser. No. 837,482
Claims priority, application Great Britain Sept. 5, 1958
9 Claims. (Cl. 152—362)

This invention relates to pneumatic tires and to filler and chafer reinforcements for pneumatic tires.

It is an object of the present invention to provide an improved filler or chafer reinforcement for a pneumatic tire.

It is a further object of the present invention to provide an improved pneumatic tire.

According to the invention a filler or chafer reinforcement for a pneumatic tire carcass comprises a layer or layers of filamentary material in the form of an annulus, the filamentary material being arranged in the form of a plurality of spiral convolutions lying parallel to one another in side-by-side relationship and the layer or layers extending generally in a radial direction with respect to the annulus or generally at an acute angle to the radial direction of the annulus.

According to the invention, also, a pneumatic tire comprises a carcass incorporating a filler or chafer reinforcement as defined in the preceding paragraph.

The filler or chafer reinforcement may be formed from, for example, steel cord, rayon, cotton, nylon or silk.

Four embodiments of the invention will now be described by way of example with reference to the accompanying drawings, in which.

Figure 1:
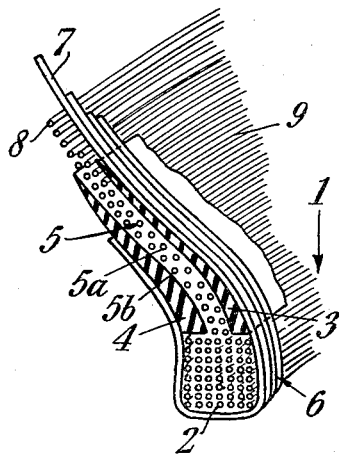
FIGURE 1 is a diagrammatic cross-sectional isometric view of part of one bead region of a tire carcass including a filler reinforcement according to the invention.

In the embodiment illustrated in FIGURE 1, the bead region 1 of a tire carcass comprises a composite bead wire 2, rubber apex strips 3 and 4, a filler reinforcement 5 sandwiched between the apex strips 3 and 4 and a carcass reinforcing ply 6 of rubberised steel cords 7.

The filler reinforcement 5 comprises two layers 5a and 5b respectively of rubberised steel wire cord 8, each layer of cord being formed from a plurality of side-by-side convolutions 9 of a continuous length of the cord 8. The convolutions 9 pass spirally around the whole circumference of the bead region, each convolution being substantially parallel with the bead wire 2 throughout its length.

The layer 5a is of smaller external diameter than the layer 5b in order to provide a gradual reduction in the stiffness of the filler reinforcement 5 in the region remote from the composite bead wire 2.

The production of the filler reinforcement shown in FIGURE 1 is carried out as follows. The composite bead wire 2 is placed in an annular recess formed in a horizontal rotatable table, part of the bead wire extending axially above the surface of the table. The apex strip 3 is then laid on the table, which is suitably contoured to give the finished assembly the cross-sectional shape shown in FIGURE 1, and the layer 5a of the reinforcement 5 is wound from rubberised steel cord 8 by rotation of the table, the winding lying around the bead wire 2 and on top of the apex strip 3 in a series of spiral convolutions of gradually increasing radius. On completion of the layer 5a, the cord 8 is severed and the process is repeated to form the layer 5b. The apex strip 4 is then fitted to complete the bead wire and filler assembly, and the assembly is removed from the table for incorporation into a tire carcass in the conventional manner.

Figure 2:
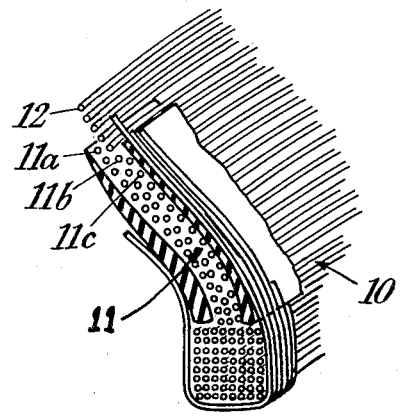
FIGURE 2 is a diagrammatic cross-sectional isometric view of part of one bead region of a tire carcass including an alternative form of filler reinforcement according to the invention.

In the embodiment illustrated in FIGURE 2, the bead region 10 of a tire carcass is similar in all respects to that illustrated in FIGURE 1, except that the filler reinforcement 11 comprises three layers 11a, 11b, and 11c of rubberised steel cord 12. The layer 11a is of smaller external diameter than the layer 11b, and the layer 11c is of smaller external diameter than the layer 11a, in order to provide a gradual reduction in stiffness at the outer edge of the reinforcement 11 as in the previous example.

The manufacture of the composite bead wire and filler assembly shown in FIGURE 2 may be carried out in a similar manner to that described above in the case of the assembly shown in FIGURE 1.

Figure 3:
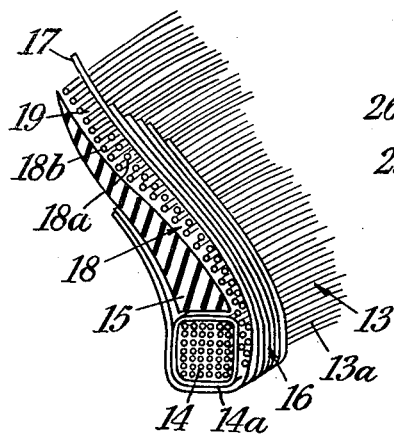
FIGURE 3 is a diagrammatic cross-sectional isometric view of part of one bead region of a tire carcass including a further alternative form of filler reinforcement according to the invention.

FIGURE 3 shows an alternative arrangement of a filler reinforcement according to the invention. The bead region 13 comprises a composite bead wire 14, an apex strip 15, and a carcass reinforcing ply 16 of rubberised steel cords 17. A filler reinforcement 18 is provided on the inner side 13a of the bead region 13 between the bead wire 14 and apex strip 15, on the one side, and the ply 16 on the other side.

The filler reinforcement 18 comprises two layers 18a and 18b of rubberised steel cord 19, which correspond respectively to the layers 5a and 5b shown in FIGURE 1, and are similar in construction to the layers 5a and 5b. The layers 18a and 18b extend between the composite bead wire 14 and the carcass ply 16, the layer 18a extending nearer to the base 14a of the bead wire 14 than the layer 18b.

The manufacture of the composite bead wire and filler assembly shown in FIGURE 3 is carried out by winding the reinforcement on the bead wire 14 and apex strip 15 in a similar manner to that described for the construction shown in FIGURE 1.

Figure 4:
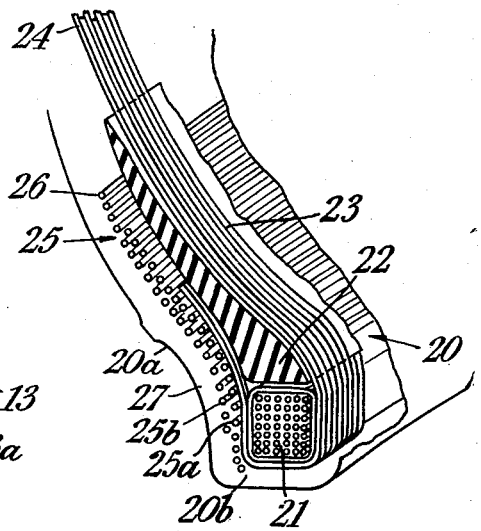
FIGURE 4 is a diagrammatic cross-sectional isometric view of part of one bead region of a tire carcass incorporating a chafer reinforcement according to the invention.

FIGURE 4 illustrates a chafer reinforcement according to the invention. A bead region 20 of a tire carcass comprises a composite bead wire 21, a rubber apex strip 22, and a carcass reinforcing ply 23 of rubberised steel cords 24. On the outer side 20a of the bead region 20, a chafer reinforcement 25 is provided. The reinforcement 25 comprises two layers 25a and 25b of rubberised steel cord 26, and is similar in construction to the filler reinforcements described above. The layer 25a extends as far as the heel 20b of the bead region, the layer 25b commencing at a greater diameter than the heel 20b and extending beyond the layer 25a to provide a gradual reduction of stiffness in the region remote from the bead wire 21. In the finished tire the chafer reinforcement 25 is covered with a layer of rubber 27.

The reinforcement 25 is produced by winding the rubberised cord 26 upon a rotatable table in a similar manner to the reinforcements of the constructions illustrated in FIGURES 1–3. The reinforcement 25 is then applied to the carcass, covered by a thin annular strip of rubber, and the assembly is moulded in the conventional manner.

In an alternative construction, a filler reinforcement is wound integrally with the bead wire, the composite bead wire winding being preferably of steel cord, and being continued radially outwardly to form the filler.

A filler or chafer reinforcement constructed as described above has the advantage that there are only two ends of steel cord for each layer, as compared with the large number of cord ends present in filler reinforcements bias-cut from conventional tire building fabric. Thus the tendency, in conventional constructions, for ply separation to take place, in use, as a result of the pounding of the carcass plies upon the radially outermost ends of the cords of the filler or chafer, is considerably reduced in the present construction since the number of ends is reduced to a minimum.

Filler or chafer reinforcements made in accordance with the present invention are easily manufactured by mechanical winding apparatus, thus eliminating a considerable amount of the manual labour that is required to make a corresponding conventional reinforcement by the manufacture of ply fabric and the cutting of suitable lengths of reinforcement.

Having now described our invention, what we claim is:

1. A pneumatic tire comprising a carcass incorporating at least one carcass ply and having a composite bead wire and a bead reinforcement of unwoven construction, said bead reinforcement extending radially outwardly of the bead wire in the region of the chafer and filler, said bead reinforcement comprising at least one layer consisting of filamentary material in the form of an annulus, the filamentary material being arranged in the form of a plurality of spiral convolutions of successively increasing diameter lying parallel to one another in side-by-side relationship.

2. A pneumatic tire comprising a carcass incorporating a filler reinforcement according to claim 1, the whole of said reinforcement being disposed radially outside a bead wire.

3. A pneumatic tire comprising a carcass incorporating a filler reinforcement according to claim 1, said reinforcement being disposed so that part of the reinforcement lies radially outside a bead wire and part of the reinforcement lies adjacent to said bead wire on the side nearer the interior of the tire.

4. A pneumatic tire comprising a carcass incorporating a pair of beads, each of said beads having a chafer reinforcement according to claim 1, each chafer reinforcement extending radially outwardly from the heel of its associated bead.

5. A pneumatic tire comprising a carcass incorporating a filler reinforcement according to claim 1 wherein said filler reinforcement is wound integrally with a bead wire.

6. A pneumatic tire comprising a carcass having a filler reinforcement according to claim 1 wherein the reinforcement comprises a plurality of layers of filamentary material said layers having different external diameters.

7. A pneumatic tire comprising a carcass having a filler reinforcement according to claim 1 wherein the filamentary material is steel cord.

8. A pneumatic tire comprising a carcass provided with a pair of side walls and incorporating a pair of composite bead wires each bead wire having a reinforcement consisting of cords in side by side arrangement of successive circular formation extending from said bead wire within said carcass toward the adjacent side wall thereof.

9. The pneumatic tire of claim 8 having two layers of reinforcement one layer extending farther toward the side wall of the carcass than the other.

References Cited in the file of this patent

UNITED STATES PATENTS

| | | |
|---|---|---|
| 1,451,645 | Archer | Apr. 10, 1923 |
| 2,501,372 | Benson | Mar. 21, 1950 |
| 2,592,844 | Antonson | Apr. 15, 1952 |
| 2,820,500 | Dickerson | Jan. 21, 1958 |

FOREIGN PATENTS

| | | |
|---|---|---|
| 1,156,511 | France | Dec. 16, 1957 |